Aug. 27, 1929.                R. JAHR                 1,726,268
OPTICAL INSTRUMENT FOR THE EXAMINATION OF SPACES WHICH ARE
          ACCESSIBLE ONLY THROUGH NARROW ENTRANCES
              Filed Sept. 28, 1928      2 Sheets-Sheet  1
1. 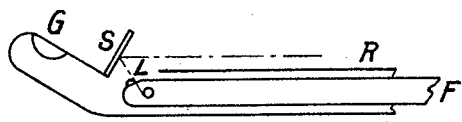
2. 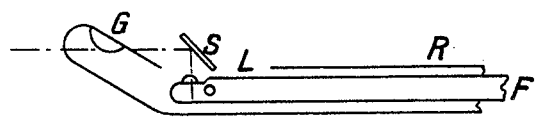
3. 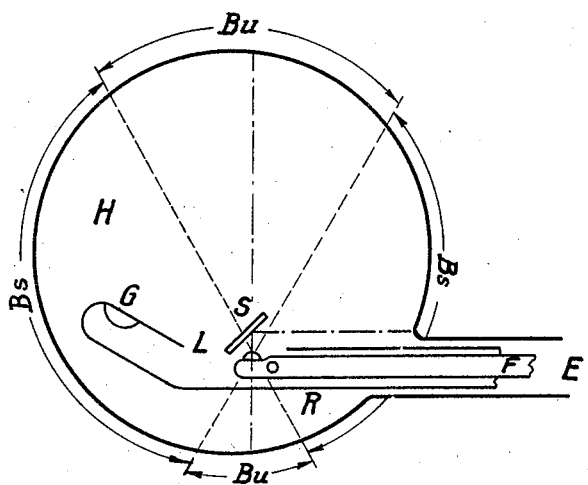
Inventor:
R. Jahr
By: Marks & Clerk

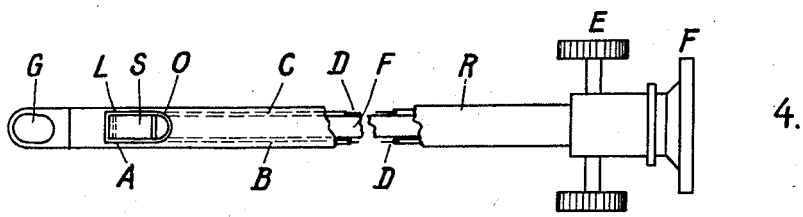
4.
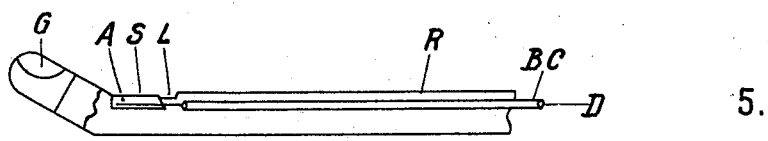
5.
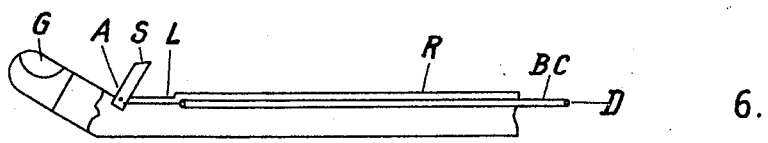
6.
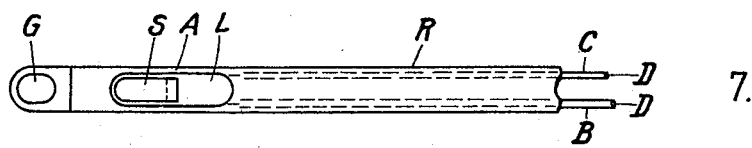
7.
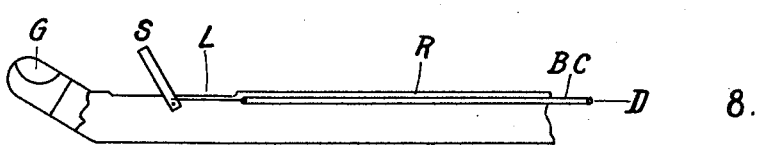
8.
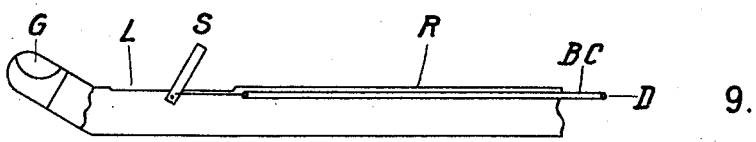
9.

Patented Aug. 27, 1929.

1,726,268

UNITED STATES PATENT OFFICE.

RUDOLF JAHR, OF FREIBURG, GERMANY.

OPTICAL INSTRUMENT FOR THE EXAMINATION OF SPACES WHICH ARE ACCESSIBLE ONLY THROUGH NARROW ENTRANCES.

Application filed September 28, 1928, Serial No. 309,068, and in Germany October 5, 1927.

The instruments known for the inspection of cavities in the human body and the like consist of a comparatively long tube of which the front end is provided with an electric lamp for throwing light into dark spaces and with a window or sight opening in front of the lamp. Into this tube the optic tube provided with optical lenses is introduced which reaches with its objective as far as the window and of which the central ray stands in a certain angle to the axis of the optic tube thereby limiting the range of vision. If places outside this range of vision are to be made visible, it is necessary, apart from the turning and oscillating movements of the instrument in the direction of the optic axis, to carry out levering movements in the entrance also, which, for example during examination of the bladder through the urinary passage, gives the patient great pain and makes the examination of the whole bladder more difficult for the physician. This is also a drawback of the instruments with movable prisms, in which the prisms are sunk in the instrument when introduced, and lifted out of it and placed into working position after introduction. They act as a firm prism and enable inspection of only a certain and therefore limited range of vision.

The object of the present invention does away with these disadvantages enabling a considerable enlargement of the range of vision required without exchanging the optic tube to inspect the space to be examined completely, that is to search every spot of it and to compare the different views with each other without having to perform levering movements with the instrument in the entrance. The object of this invention is distinguished by the external tube being provided with a mirror arranged in the window so that by means of a suitable mechanical appliance it can be swung so as to obtain the required effect. The mirror can be folded down in such a way that it does not project over the wall of the tube.

Supposing for example that the instrument has been introduced through the urinary passage into the bladder with the mirror folded down, the optic tube enables the immediate inspection of the usual limited space. By then erecting the mirror, the view obtained in it becomes visible in the optic tube immediately adjoining the view inspected.

If a double-sided mirror is used, for instance a mirror of metal ground on both sides and if the window is made correspondingly long, so that the objective may be set in front of the mirror as well as behind it, it is possible to see the rear view by moving the mirror backwards and the front view by moving it forwards. For the correct adjustment of the optic tube, the optic tube may be provided with a tongue. Thus, by greater or smaller inclination of the mirror, this instrument enables, without exchange of the optic tube and without making levering movements at the entrance, to obtain a view rectangular to the axis of the optic tube as well as a view adjoining it in front and behind.

For use of an optic tube, for instance obtuse-angled, with which the front view is immediately inspected, a one-sided mirror is suitable for observation of the rear view.

For example the accompanying drawing shows two modes of execution: Fig. 1 shows schematically the arrangement with a lateral mirror using an obtuse-angled optic tube; Figs. 2 and 3 show schematically the arrangement with a double-sided mirror using a rectangular optic tube; Figs. 4–6 are showing the single arrangement for the mirror-movement according to the design of Fig. 1, and Figs. 7–9 are showing the single arrangement according to the design of Figs. 2 and 3.

Fig. 4 shows in plan, the instrument with a one-sided mirror folded down, Fig. 5 being a lateral view; Fig. 6 shows the instrument with the mirror erected according to Fig. 1.

In the lateral view tube R is shown in section.

Fig. 7 shows the instrument with double-sided mirror folded down and seen from above, Fig. 8 shows it with the mirror erected according to Fig. 3.

The letter A designates the axis of rotation of the mirror, B and C are guiding-tubes for a wire D, E is a hand-wheel for moving the wire D to and fro, F is the optic tube, G is a glow-lamp, H is the bladder, L the window, O the objective, S the mirror, $Bu$ the view immediately obtained, $Bs$ is the view which is to be made visible by means of the mirror.

Figs. 1–3 represent the central ray indicated by dotted lines, the mirror S having the position which enables the forward inspection and particularly the backward inspection of the bladder-wall as far as the entrance where the instrument is introduced through the urinal passage.

Figs. 4–9 show the arrangement of the single parts for the situation and movability of the mirror S. In the examples given, the mirror shows two perforations at its lower end. In the arrangement shown by Figs. 1, 4, 5 and 6 one of the perforations serves for the introduction of the axis of rotation of the mirror supported in the wall of tube R; the other perforation serves for the passage of the wire D the two ends of which pass through the guiding-tubes B and C as far as the hand-wheel E by which they can be moved forwards and backwards in the usual way. The two perforations in the mirror S are made in such a way that the wires D act like levers on the axis A when the mirror is folded down as well as when it is in upright position. By pulling at D the mirror S is moved out of its folded position (Figs. 4 and 5) into its erect position (Fig. 6); by a pressure-movement of D the mirror S is folded from its erect position (Fig. 6) down again into the window L. Thus the mirror S can be given any position angular to the objective O.

In the arrangement as per Figs. 2, 3, 7, 8 and 9 the folded mirror S is erected by pulling at wire D, at first as far as the angular position shown by Figs. 2 and 8 for forward inspection. By pulling it further it may be moved past the vertical position, which affords a direct view before and behind the mirror, into the angular position shown by Figs. 3 and 9 ready for the inspection from the rear. By a pressure-movement of wire D the mirror S is folded down again into the window L as shown by Fig. 7. In this way the double-sided mirror S may be placed into any position angular to the optic O.

According to the purpose required, the instruments may be made in any length and thickness. But this invention also permits particularly the use of a comparatively thin tube R in order to enable an introduction into very narrow entrances, which fact is of considerable importance for instance when used as a cystoscope for rendering examinations as painless as possible for the patient in case of a narrow urinal passage and in case there exists an inflammation of the mucous membranes.

The mirror S may be made, for instance, of a highly polishable metal, may be of nickel which enables the mirror to be ground for reflection either on one side or on both.

With the instrument which forms the object of the present invention it is possible, by the employment of a single optic tube and by suitable adjustment of the mirror after the introduction of the instrument into the bladder, for instance to render the whole extent of the bladder visible merely by turning the tube R round its central axis. The mirror S also enables to inspect especially the surfaces situated nearer to the optic-axis in a more vertical aspect without a levering movement in the entrance.

I claim:

1. An optical instrument for the examination of spaces, cavities and the like accessible only through a narrow entrance including a guiding-tube provided with a window, an optic tube movable in the guiding tube, a mirror movable angularly with respect to the optic tube, the mirror being foldable down within the window and so arranged within the passage of the observation-rays of the optic tube that when the angular position to the optic tube is altered during the inspection, the whole aspect of the interior is made visible in complete succession as far as the circumference of the guiding-tube, substantially as described.

2. An optical instrument according to claim 1, wherein the mirror has reflecting surfaces on both sides, and extends in front and behind the axis of rotation of the mirror, substantially as described.

In testimony whereof I have signed my name to this specification.

Dr. RUDOLF JAHR.